US009950374B2

(12) United States Patent
Bruder et al.

(10) Patent No.: US 9,950,374 B2
(45) Date of Patent: Apr. 24, 2018

(54) WORKPIECE CLAMPING APPARATUS, MACHINE TOOL AND METHOD FOR WORKING A WORKPIECE

(71) Applicant: MAG IAS GmbH, Goeppingen (DE)

(72) Inventors: Hubert Bruder, Oberkirch (DE);
Walter Muehleis, Rechbergausen (DE);
Guido Jentzsch, Nordheim (DE);
Martin Schmid, Kirchheim/Tech (DE);
Dodwell Manoharan, Esslingen (DE);
Sebastian Schoening, Stuttgart (DE)

(73) Assignee: MAG IAS GmbH, Goeppingen (DE)

( * ) Notice: Subject to any disclaimer, the term of this patent is extended or adjusted under 35 U.S.C. 154(b) by 47 days.

(21) Appl. No.: 14/640,739

(22) Filed: Mar. 6, 2015

(65) Prior Publication Data

US 2015/0202695 A1    Jul. 23, 2015

Related U.S. Application Data

(63) Continuation of application No. PCT/EP2013/067447, filed on Aug. 22, 2013.

(30) Foreign Application Priority Data

Sep. 7, 2012   (DE) .................. 10 2012 108 370
Jan. 30, 2013  (DE) .................. 10 2013 100 948

(51) Int. Cl.
*B23B 41/12* (2006.01)
*B23B 29/02* (2006.01)
(Continued)

(52) U.S. Cl.
CPC ............. *B23B 41/12* (2013.01); *B23B 29/02* (2013.01); *B23Q 3/062* (2013.01); *B23Q 16/00* (2013.01);
(Continued)

(58) Field of Classification Search
CPC .... B23Q 3/062; B23Q 16/00; B23Q 2719/04; B23Q 2716/04; B23Q 1/76;
(Continued)

(56) References Cited

U.S. PATENT DOCUMENTS 2,020,439 A * 11/1935 Sorenson .............. B23B 39/161
                                                    408/115 R
4,234,275 A * 11/1980 Clement ................. B23B 41/12
                                                    248/646
(Continued)

FOREIGN PATENT DOCUMENTS

DE      199 19 559        11/2000
DE    10 2009 033 824     11/2010
(Continued)

*Primary Examiner* — Daniel Howell
(74) *Attorney, Agent, or Firm* — Womble Bond Dickinson (US) LLP

(57) ABSTRACT

A workpiece clamping apparatus for a machine tool is proposed, including at least one receptacle for a workpiece, wherein the at least one receptacle includes a wall and an opening via which the workpiece is insertable into the receptacle in a linear direction and removable therefrom in a counter-direction, a clamping device for fixing the workpiece at the at least one receptacle, a first access area via which a first tool engages the workpiece for a first working operation, a counter-bearing for the first tool, and a second access area via which a second tool engages the workpiece for a second working operation, wherein the first working operation and the second working operation are performed at different locations on the workpiece using different tools and wherein the workpiece clamping apparatus is free of a counter-bearing for the second tool.

6 Claims, 17 Drawing Sheets

(51) Int. Cl.
*B23Q 3/06* (2006.01)
*B23Q 16/00* (2006.01)
*B23Q 1/76* (2006.01)

(52) U.S. Cl.
CPC ......... *B23B 29/027* (2013.01); *B23B 2215/24* (2013.01); *B23Q 1/76* (2013.01); *Y10T 408/03* (2015.01); *Y10T 408/5614* (2015.01); *Y10T 408/91* (2015.01)

(58) Field of Classification Search
CPC ..... B23B 2215/24; B23B 35/00; B23B 41/12; B23B 29/027; Y10S 408/708; Y10S 408/709; Y10T 408/36; Y10T 408/367
USPC .................................................. 408/234, 89
See application file for complete search history.

(56) References Cited

U.S. PATENT DOCUMENTS

| | | | |
|---|---|---|---|
| 4,701,081 A * | 10/1987 | Hashimoto | B23B 41/12 408/1 R |
| 5,209,615 A | 5/1993 | Davis | |
| 5,788,434 A | 8/1998 | Harmand | |
| 6,287,057 B1 * | 9/2001 | Kurz | B23B 29/02 408/1 R |
| 6,350,181 B1 | 2/2002 | Wirz | |
| 6,536,997 B1 * | 3/2003 | Kress | B23B 41/12 408/1 R |
| 2009/0297286 A1 * | 12/2009 | Kamphuis | B23B 41/12 408/1 R |
| 2010/0310328 A1 | 12/2010 | Wilkins | |
| 2012/0237307 A1 * | 9/2012 | Niitani | B23B 29/02 408/199 |
| 2014/0191455 A1 | 7/2014 | Marquoin et al. | |
| 2014/0259663 A1 * | 9/2014 | Scelsi | B25H 1/0007 29/888.01 |

FOREIGN PATENT DOCUMENTS

| | | | |
|---|---|---|---|
| GB | 2 173 132 | | 10/1986 |
| JP | 56033210 A | * | 4/1981 |
| JP | 2003-181731 | | 7/2003 |
| JP | 2012091307 A | * | 5/2012 |

* cited by examiner

WORKPIECE CLAMPING APPARATUS, MACHINE TOOL AND METHOD FOR WORKING A WORKPIECE

CROSS-REFERENCE TO RELATED APPLICATIONS

This application is a continuation of international application number PCT/EP2013/067447, filed on Aug. 22, 2013, which claims priority to German application No. 10 2012 108 370.3, filed Sep. 7, 2012 and German application No. 10 2013 100 948.4, filed Jan. 30, 2013, which are incorporated herein by reference in their entirety and for all purposes.

FIELD OF THE INVENTION

The invention relates to a workpiece clamping apparatus for a machine tool.

The invention further relates to use of a workpiece clamping apparatus.

Furthermore, the invention relates to a machine tool.

Furthermore, the invention relates to a method for working (machining) a workpiece on a machine tool.

SUMMARY OF THE INVENTION

In accordance with an embodiment of the invention, a workpiece clamping apparatus is provided which enables time-efficient working of a workpiece.

In accordance with an embodiment of the invention, the workpiece clamping apparatus comprises at least one receptacle for a workpiece, wherein the at least one receptacle comprises a wall and an opening via which the workpiece is capable of being inserted into the receptacle in a linear direction and removed therefrom in a counter-direction, a clamping device for fixing the workpiece at the at least one receptacle, a first access area via which a first tool engages the workpiece for a first working operation, a counter-bearing for the first tool, and a second access area via which a second tool engages the workpiece for a second working operation, wherein the first working operation and the second working operation are performed at different locations on the workpiece using different tools and wherein the workpiece clamping apparatus is free of a counter-bearing for the second tool.

In the workpiece clamping apparatus constructed in accordance with the invention, by corresponding positioning of the workpiece clamping apparatus, in particular relative to a tool spindle, the first working operation can be performed and the second working operation can be performed spaced in time from the first working operation without changing the clamping setup of the workpiece. Because the clamping setup need not be changed, the result is time-efficient working.

Because no counter-bearing is provided for the second tool, both the first working operation and the second working operation can be performed on the workpiece without the need to change the clamping setup thereof.

Furthermore, because no counter-bearing is provided for the second tool, the workpiece can be easily loaded and unloaded via the opening and the result here, too, is time-efficient working.

Furthermore, the second tool need not be threaded into a counter-bearing and the result here, too, is a saving in time.

The workpiece clamping apparatus can be fixedly or releasably positioned on a workpiece carrier of a machine tool. In particular, the first access area or the second access area can be positioned relative to a tool spindle by way of a pivotal movement (which may be combined with one or more linear movements).

By use of a workpiece clamping apparatus constructed in accordance with the invention, an engine block can be worked in a time-efficient manner; in particular, the first working operation is a crankshaft bearing bore working operation and the second working operation is a cylinder bore working operation. These working operations can be performed in the same clamping and on the same machine tool (in particular in combination with a tool change operation).

It is advantageous for the counter-bearing to be arranged or formed at the wall of the at least one receptacle or to form at least part of said wall. It is thereby possible for the counter-bearing to be also part of the receptacle and for example, in addition to its property of forming a counter-bearing for the first tool, to contribute towards the positioning and fixing of the workpiece.

It is advantageous for the counter-bearing to be arranged transversely and in particular perpendicularly to the opening. In this way, the counter-bearing does not hinder the loading and unloading of a workpiece to and from the workpiece clamping apparatus.

It is particularly advantageous for the counter-bearing to have an entry area for the first tool. Via the entry area, the first tool can, in a sense, be fixed at the counter-bearing. A fixing location is thereby predefined for the first tool. This allows the workpiece to be worked upon over a "greater distance". For example, the tool has a plurality of cutting edges which are advanced towards the workpiece. By providing a counter-bearing, the tool can have a relatively long length; i.e., a plurality of spaced-apart cutting edges can be provided over a greater length, for example.

In particular, the first access area has a cross-sectional area which is oriented transversely to the opening. Accordingly, the workpiece can thereby be worked upon by the first tool. By way of example, a crankshaft bearing bore working operation is performed. It is advantageous for the first access area to have a cross-sectional area which is oriented at least approximately parallel to the counter-bearing. The first tool is, in a sense, passed through the cross-sectional area so that it can be supported on the counter-bearing.

For the same reason it is also advantageous for the first access area to be associated with a linear first direction which is a feed direction or working direction of the first tool, wherein the first direction is oriented at least approximately parallel to or at an acute angle (in particular less than 30°) with respect to the opening. Crankshaft bearing bore working operations can thereby be performed for example.

It is then advantageous for the second access area to have a cross-sectional area which is parallel to or at an acute angle of less than 30° with respect to the opening. In this way, access to the workpiece is not hindered. No counter-bearing need be provided.

For the same reason, it is advantageous for the second access area to have a cross-sectional area which is oriented transversely to the counter-bearing.

It is further advantageous for the second access area to be associated with a linear second direction which is a feed direction or working direction of the second tool, wherein the second direction is oriented transversely with respect to the opening. A corresponding access area is thereby provided in order to perform the second working operation.

It is particularly advantageous for the first access area and the second access area to be arranged and configured such that, starting from a positioning of the first access area relative to a point fixed in space, the second access area is capable of being positioned relative to that space-fixed point by way of a pivotal movement of the workpiece clamping apparatus as a whole and/or such that, starting from a positioning of the second access area relative to a point fixed in space, the first access area is capable of being positioned relative to that space-fixed point by way of a pivotal movement of the workpiece clamping apparatus as a whole. In a machine tool, the space-fixed point is predefined by a position of a tool on a tool spindle. By a corresponding pivotal movement, the workpiece can be positioned relative to the tool in order to perform the corresponding working operation. It is possible to perform different working operations at different locations on the workpiece and employing different tools without having to change the clamping setup.

In an exemplary embodiment, the workpiece clamping apparatus comprises a height adjustment device by way of which the counter-bearing is lockably adjustable in its height position relative to a receptacle bottom of the at least one receptacle. This results in an adjustment capability at the workpiece clamping apparatus to enable the latter to be adapted to a workpiece and, for example, to different workpieces.

In an exemplary embodiment, a receptacle bottom is provided with at least one through-recess for the second tool. In principle, the possibility exists for a second working operation to be performed from above (from the free side of the workpiece) or from below (from the side of the workpiece on which it is set down). If working is to be effected from below, access to the workpiece can be achieved through the through-recesses in the receptacle bottom (which do not form counter-bearings).

In an exemplary embodiment, the workpiece is an engine block, the first working operation is a crankshaft bearing bore working operation and the second working operation is a cylinder bore working operation. It is then possible to perform both a crankshaft bearing bore working operation and a cylinder bore working operation in which the clamping setup of the workpiece need not be changed. This results in time-efficient working.

A machine tool constructed in accordance with the invention comprises at least one workpiece carrier and at least one tool spindle, wherein the at least one workpiece carrier has fixedly or releasably arranged thereon at least one workpiece clamping apparatus constructed in accordance with the invention.

It is advantageous for the at least one workpiece carrier to be capable of being pivoted about at least one axis. The axis is for example a horizontal axis (A-axis) or a vertical axis (B-axis). The pivoting capability of the workpiece carrier allows a workpiece clamping apparatus together with a clamped workpiece arranged on the workpiece carrier to be pivoted. It is thereby possible for different working areas (the different access areas) to be positioned with respect to a tool spindle and thus a tool without changing the clamping setup.

In an exemplary embodiment, the at least one tool spindle is oriented in a horizontal direction relative to the direction of gravity. This results in a wide range of working possibilities, in particular where the machine tool is a machining center.

It is particularly advantageous for the at least one tool spindle and the at least one workpiece carrier to be displaceable relative to each other in at least three linearly independent directions. This results in a wide range of positioning possibilities and working possibilities. For instance, provision may be made for the at least one tool spindle to be displaceable on a corresponding machine frame in two linearly independent directions and for the at least one workpiece carrier to be displaceable in the third direction. It is in principle also possible for the tool spindles to be held on a machine frame for linear displacement in all of the three directions.

In particular, by the at least one workpiece carrier, via a pivoting movement thereof, optionally the first access area or the second access area is capable of being positioned in a working position relative to the at least one tool spindle. This allows both the first working operation and the second working operation to be performed (spaced in time) on the same machine without changing the clamping setup. This results in time-efficient working.

In an embodiment, the at least one workpiece carrier has at least one through-recess for the second tool. If the workpiece is to be worked upon from below, then the at least one through-recess provides an access area of the second tool to access the workpiece.

It is advantageous for the at least one tool spindle to comprise a tool having one or more tool elements that are capable of being retracted and extended, in particular wherein provision is made for actuation by at least one rod. The one or more tool elements are for example cutting edges. These are arranged on the tool and are capable of being retracted and extended in a direction transverse to a longitudinal axis of the at least one tool spindle or the tool, i.e., a diameter of the tool in the area of a cutting edge depends on whether such a cutting edge as a tool element is in its retracted or in its extended position. It is thereby possible to enter the tool over a portion thereof into a recess in a workpiece being worked upon, wherein during this phase of entry the one or more tool elements are in the retracted condition and the effective diameter of the tool is minimized. After an entry operation, the tool element(s) can then be extended in order to effect working inside an inner cavity of the workpiece. For example, it is thereby possible to perform a boring operation by linear reverse displacement. Entry into the workpiece recess is a forward motion of the tool spindle, and the working movement with extended cutting edges as tool elements is a reverse motion. This results in a time-saving working of the workpiece, in particular because the tool (the tool spindle) has transverse advancement capability and no lifting or displacing of the workpiece as a whole is required. This results in reduced cycle times. Furthermore, it is also possible for the tool spindle or tool to feed concentrically into a recess, and in particular a bore, of a workpiece. A crankshaft bore can thereby be worked, for example.

In accordance with an embodiment of the invention, a method is provided in which the workpiece is fixed in a workpiece clamping apparatus and a first working operation is performed using a first tool, wherein the first tool is positioned on a counter-bearing of the workpiece clamping apparatus, and in which a second working operation is performed on the workpiece separated in time from the first working operation and using a second tool, wherein the second tool is positioned relative to the workpiece clamping apparatus in a manner free of a counter-bearing and wherein the workpiece is located in the same clamping setup for the first working operation and for the second working operation.

The first working operation can be performed preceding in time or following in time the second working operation.

The advantages of the method in accordance with the invention have already been explained in connection with the workpiece clamping apparatus constructed in accordance with the invention.

In particular, the workpiece clamping apparatus as a whole is pivoted after completion of the first working operation in order to position the workpiece relative to the second tool for the second working operation and/or the workpiece clamping apparatus as a whole is pivoted after completion of the second working operation in order to position the workpiece relative to the first tool for the first working operation. This provides a simple way of performing a plurality of working operations on the same workpiece in the same clamping setup and in the same machine tool.

In particular, the first working operation is a crankshaft bearing bore working operation and the second working operation is a cylinder bore working operation, with these working operations being performed on an engine block as a workpiece.

It is advantageous for the workpiece to be inserted into a receptacle of the workpiece clamping apparatus in a linear direction and to be removed therefrom in a counter-direction. This allows the loading and unloading operations to be effected in a time-efficient manner. The load and unload operations are not hindered by a counter-bearing for the second tool.

In an exemplary embodiment, provision is made for the first tool to comprise at least one tool element capable of being advanced towards the workpiece, wherein the at least one tool element is in a retracted position when the first tool enters a recess of the workpiece and is then extended for working the workpiece, in particular wherein for working the workpiece, the first tool is displaced in a direction counter to that of a direction of entry thereof. The at least one tool element is for example a cutting edge. When the cutting edge is retracted, the tool can, over a portion thereof, be entered into a recess, in particular a bore, in the workpiece and it is then in particular possible for the cutting edge to be passed through the corresponding area of the workpiece. Subsequently, the at least one tool element is advanced towards the workpiece so that the latter can be worked. By way of example, the first tool is then displaced in a direction counter to a direction of entry thereof. With the tool element in the extended condition, the bore can then be worked.

The following description of preferred embodiments, taken in conjunction with the drawings, serves to explain the invention in greater detail.

BRIEF DESCRIPTION OF THE DRAWINGS

FIG. 12 is a further sectional view similar to that of FIG. 8 but wherein FIG. 12 shows a first tool and FIG. 8 shows a second tool;

DETAILED DESCRIPTION OF THE INVENTION

An exemplary embodiment of a machine tool with which a workpiece clamping apparatus constructed in accordance with the invention can be utilized is a machining center. An embodiment of a machining center, shown in the partial schematic view of FIGS. 1 and 2 and indicated therein by 10, comprises a machine bed 12 on which a machine frame 14 is arranged. The machine frame 14 is of portal-type configuration and projects beyond the machine bed 12 in a vertical direction relative to the direction of gravity g. Held on the machine frame 14 is a tool carrier device 16 which comprises at least one tool spindle 18.

Figure 1:
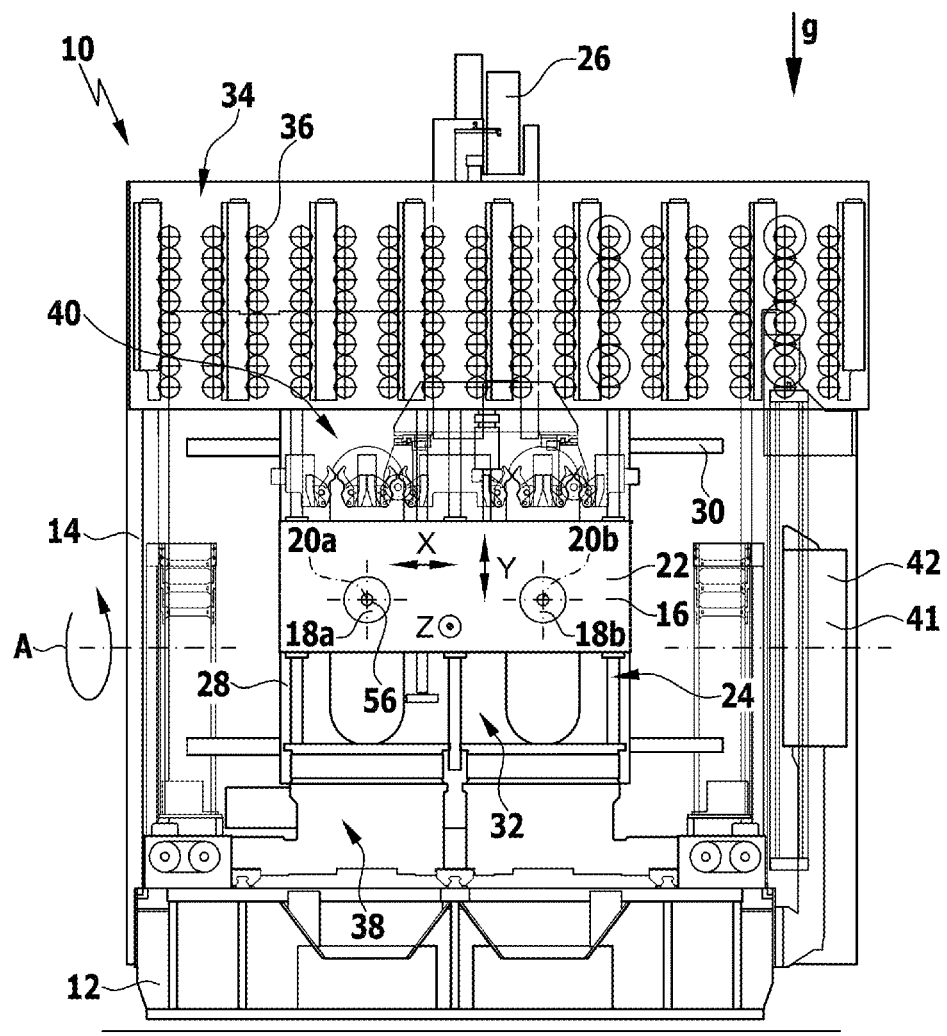
FIG. 1 is a schematic partial view of an exemplary embodiment of a machine tool.
Figure 2:
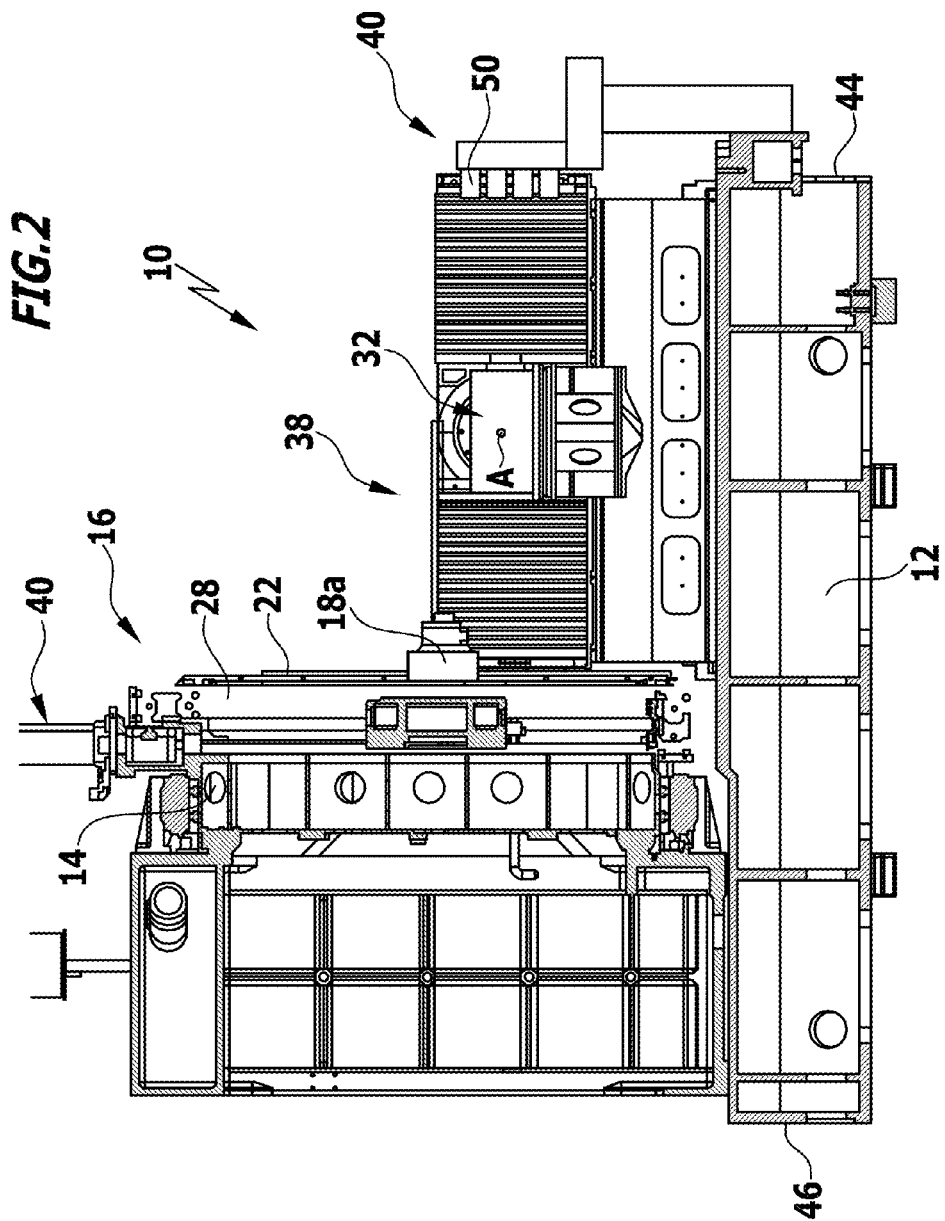
FIG. 2 is a side view of the machine tool in accordance with FIG. 1 (with the enclosure removed)

In the exemplary embodiment shown, the tool carrier device 16 comprises a first tool spindle 18a and a second tool spindle 18b. A tool held on the respective tool spindle 18a, 18b is capable of being rotated about a rotational axis 20a, 20b. In the illustration of FIG. 1, the rotational axes 20a, 20b are parallel to one another. They are oriented parallel to a Z-direction which, as illustrated in FIG. 1, is perpendicular to the plane of drawing. The Z-direction is in particular a horizontal direction relative to the direction of gravity g.

The tool carrier device 16 is configured as a slide 22 which is held on a slide guide 24 and is capable of being linearly moved in a Y-direction (direction and counter-direction) via the slide guide 24. The Y-direction is transverse and in particular perpendicular to the Z-direction. The Y-direction is in particular a vertical direction relative to the gravity direction g.

To drive the movement of the slide 22 in the Y-direction and to position it, a drive device 26 is associated with the slide 22. Said drive device 26 can comprise a ball screw or a linear motor, for example.

The slide 22 is itself held on a slide 28 which is capable of being linearly displaced in an X-direction (direction and counter-direction) on a slide guide 30. A corresponding drive is provided for displacement and positioning. The X-direction is transverse and in particular perpendicular to the Y-direction and the Z-direction. The X-direction is in particular a horizontal direction relative to the direction of gravity g.

Arranged on the machine bed 12 is (at least) one workpiece carrier 32. The first tool spindle 18a and the second tool spindle 18b and thus tools held thereon and the workpiece carrier 32 are movable relative to one another in the Z-direction (direction and counter-direction). A workpiece held on the workpiece carrier 32 and the tool spindle 18a or 18b are therefore displaceable relative to each other in the X-direction as a first direction, in the Y-direction as a second direction and in the Z-direction as a third direction.

The workpiece carrier or a workpiece holding portion thereof is pivotable about an axis (A-axis), said axis being a horizontal axis relative to the direction of gravity g. Alternatively, or additionally, the workpiece carrier 32 (or a part thereof) can be pivotable about a vertical axis (B-axis).

In one exemplary embodiment, the tool spindles 18a, 18b are not movable in the Z-direction for working a workpiece and the workpiece carrier 32 is held on the machine bed for displacement in the Z-direction. To this end, the workpiece carrier 32 has a drive associated with it.

In an alternative exemplary embodiment, the first tool spindle 18a and the second tool spindle 18b are held for displacement on the tool carrier device 16 to enable Z-displacement capability.

It is also possible to combine a Z-displacement capability of the tool spindles 18a, 18b on the tool carrier device 16 and a Z-displacement capability of the workpiece carrier 32 on the machine bed.

For example, it can also be provided for the workpiece carrier 32 to be rotatable about a for example vertical axis.

In the exemplary embodiment shown, the machining center 10 has a storage device 34 for tools 36 which is arranged above a workspace 38 in which workpieces are worked.

Further, a tool changing device 40 is provided via which tools 36 are capable of being inserted on the tool spindles 18a and 18b and removed therefrom.

A corresponding machining center is for example described in WO 2009/033920 A1 or U.S. Pat. No. 8,192, 115. These printed publications are incorporated herein and made a part hereof by reference in their entirety and for all purposes.

It is also possible for the machining center 10 to comprise only a single tool spindle or to comprise more than two tool spindles.

The machining center 10 has a control device 41 which is at least partially arranged in a control cabinet 42. The control device 41 allows sequences of workpiece working operations to be controlled.

The machining center 10 has a front side 44 and a rear side 46. The workspace 38 faces towards the front side 44.

In an exemplary embodiment, one or more additional devices 48 are arranged on the front side 44. An additional device 48 can be used to act upon a workpiece in addition to tools mounted on tool spindles 18.

In an exemplary embodiment, a cleaning device 50 is provided as an additional device 48. A workpiece is capable of being moved by way of the workpiece carrier 32 to the cleaning device 50. The workpiece can be cleaned there for example after a first working operation thereon and before a second working operation thereon. The working quality can thereby be improved. Cleaning is carried out by blowing or by direct action of the cleaning device, for example.

By way of example, the additional device 48 can also be formed by or comprise a fluid jet device. By use of the fluid jet device, a workpiece can have a fluid jet applied thereto. The fluid jet can be a gas jet and/or a liquid jet. By appropriate configuration, a fluid jet honing operation can thereby be performed, for example.

Alternatively or additionally, provision may be made for the additional device 48 to be formed by or to comprise a laser device, for example. It is thereby possible for example to perform a laser structuring operation on a workpiece.

The additional device 48 or the additional devices 48 are arranged at an edge of the workspace 38, for example at the front side 44, so that an additional device 48 does not hinder the relative movability between the workpiece carrier 32 and the tool spindles 18a, 18b.

An exemplary embodiment of a tool spindle comprises an interface to a tool. The interface is, for example, configured as a HSK ("hollow taper shank") interface. At the interface, a tool 56 is capable of being inserted into the tool spindle and is capable of being releasably fixed thereto. The fixing is rotationally fixed so that when a corresponding rotatable part of the tool spindle is rotated about for example the rotational axis 20a, the tool is rotated therewith.

Figure 3:
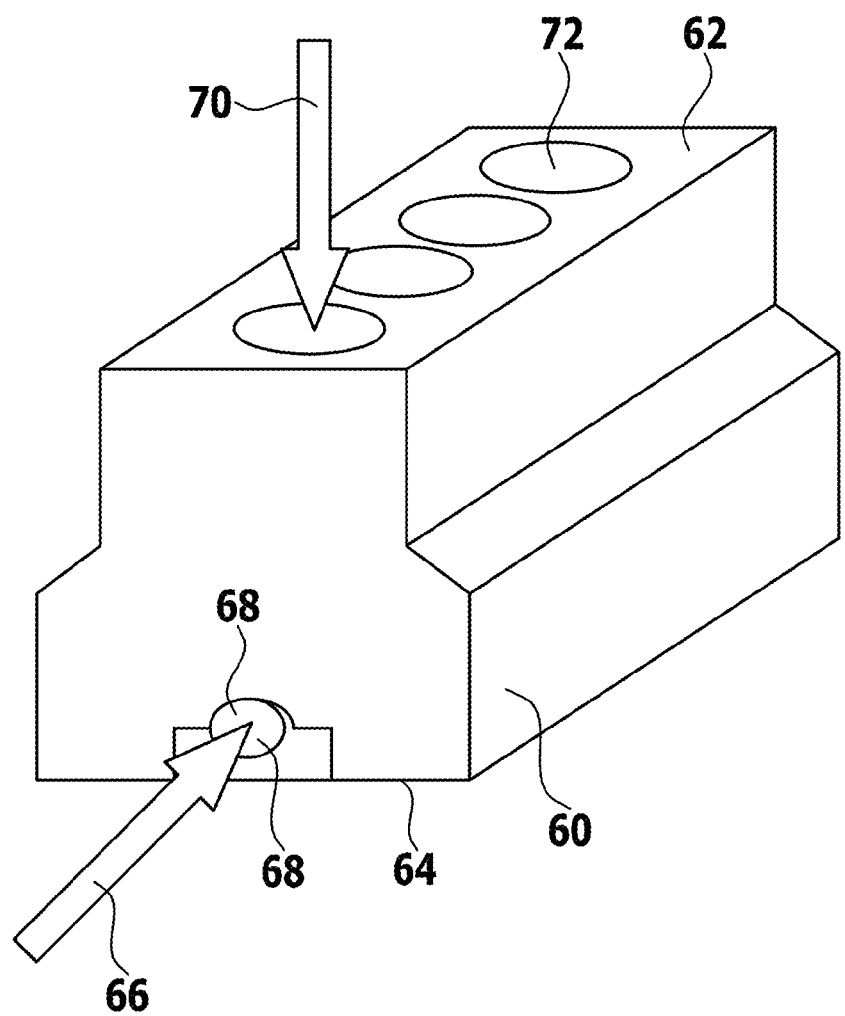
FIG. 3 is a diagrammatic representation of an engine block as a workpiece, indicating different working operations.

The machine tool 10 can be used to work an engine block 60 (FIG. 3) as a workpiece. The engine block 60 has a cylinder head side 62 and an oil pan side 64 opposite thereto. In a first working operation on a bore 68', a crankshaft bearing bore 68 is created or worked in the engine block 60. In a second working operation 70, cylinder bores 72 are produced. For the first working operation 66, a first tool is inserted on the respective tool spindle 18a, 18b, said first tool then performing the first working operation 66. For the second working operation 70, a second tool is inserted on the respective tool spindle 18a, 18b, said second tool then performing the second working operation 70.

The first working operation 66 and the second working operation 70 are performed one after another in time, wherein the first working operation 66 can be performed preceding in time the second working operation 70 or following in time the second working operation 70.

For fixing the engine block 60 as a workpiece at the workpiece carrier 32, a workpiece clamping apparatus constructed in accordance with the invention is used, as will be described in greater detail below.

Figure 4:
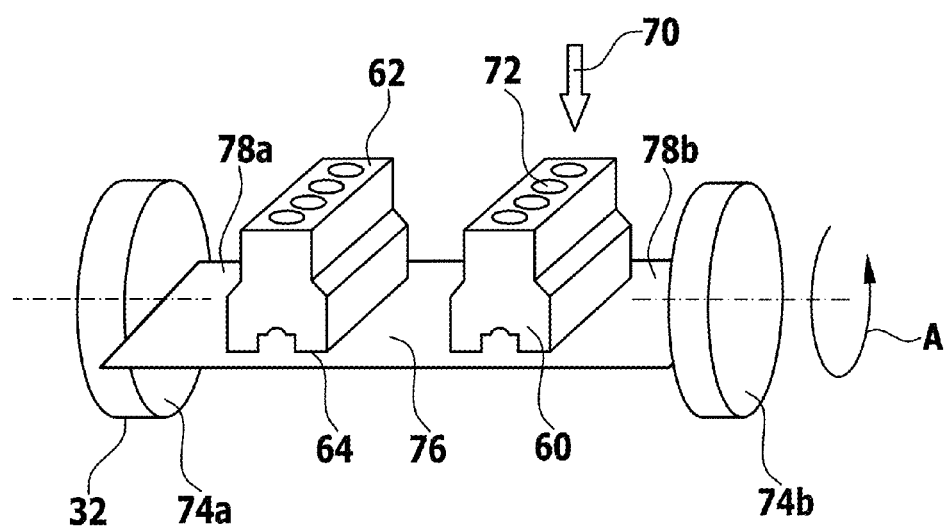
FIG. 4 diagrammatically illustrates a first possibility of how engine blocks as workpieces can be positioned on a workpiece carrier.
Figure 5:
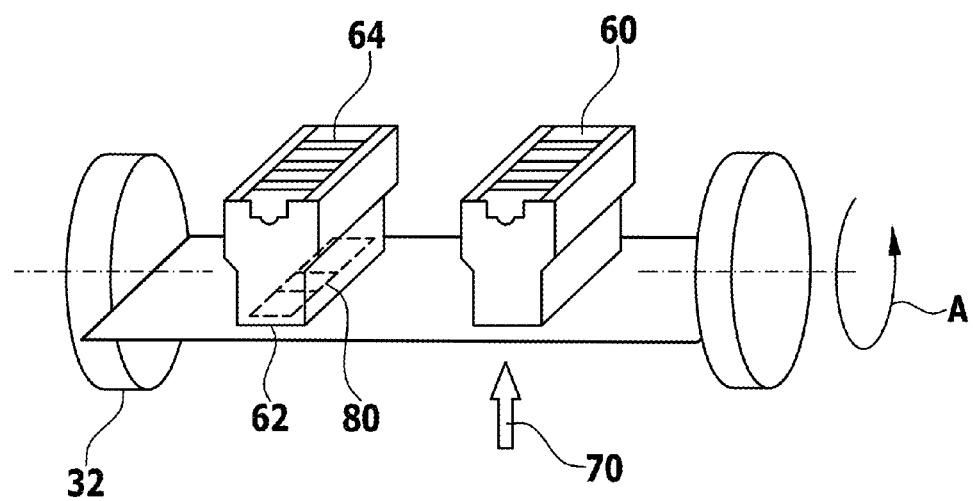
FIG. 5 illustrates another possibility of how engine blocks as workpieces can be positioned on a workpiece carrier.
Figure 6:
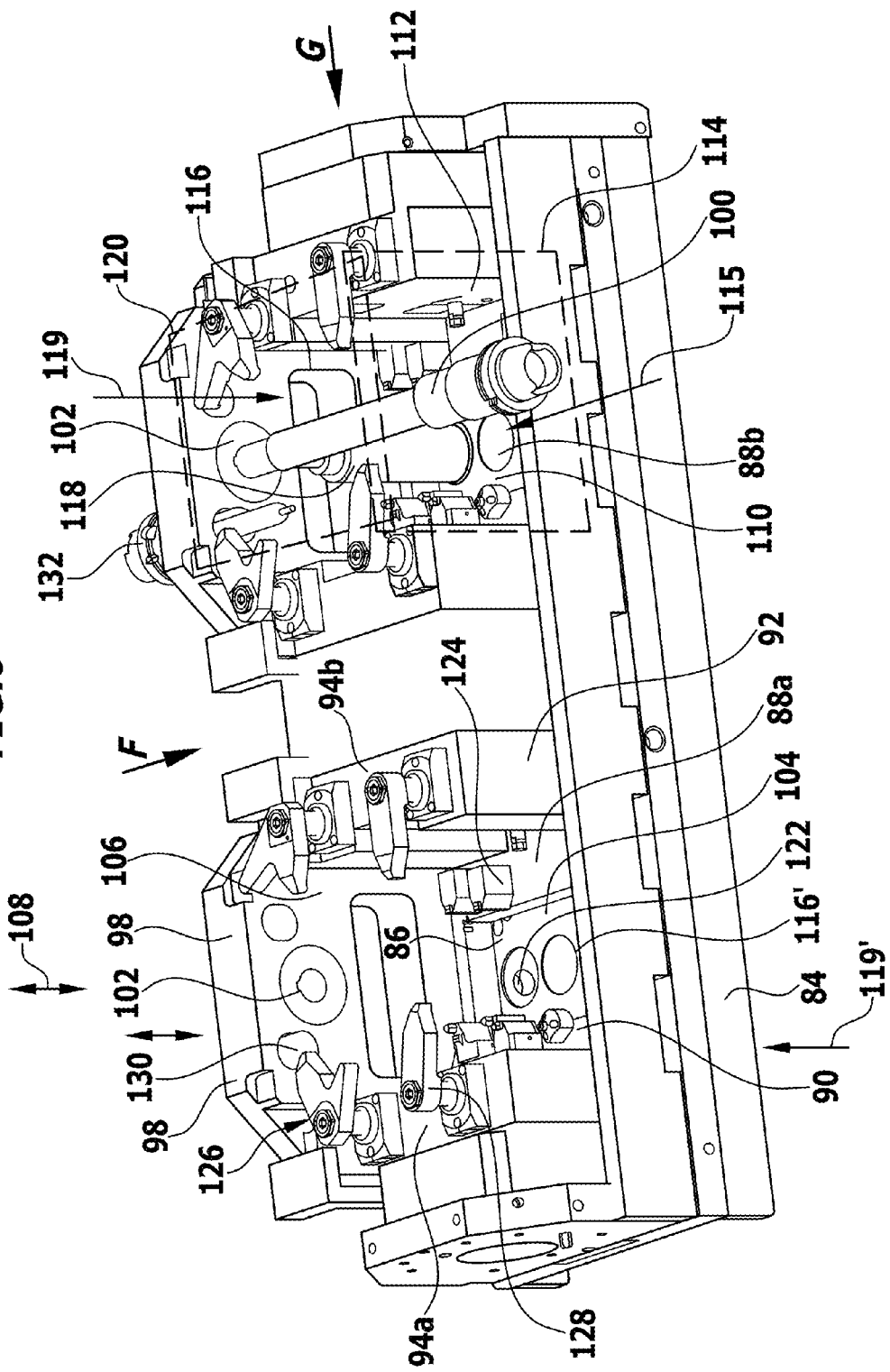
FIG. 6 is a perspective view illustrating an exemplary embodiment of a workpiece clamping apparatus constructed in accordance with the invention, there being also indicated tools held on a tool spindle of the machine tool.
Figure 7:
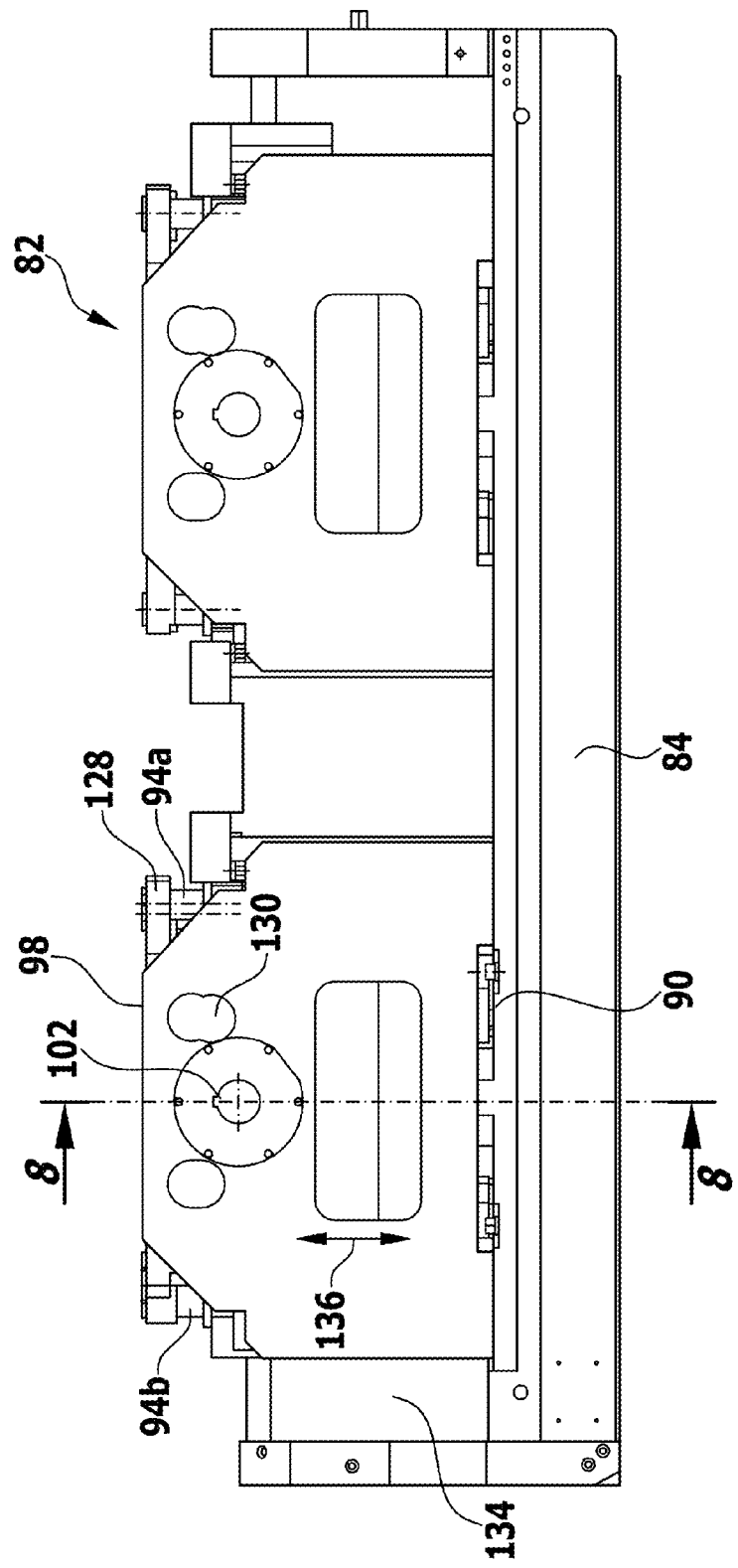
FIG. 7 is a rear view of the workpiece clamping apparatus in accordance with FIG. 6, seen in the direction F.
Figure 8:
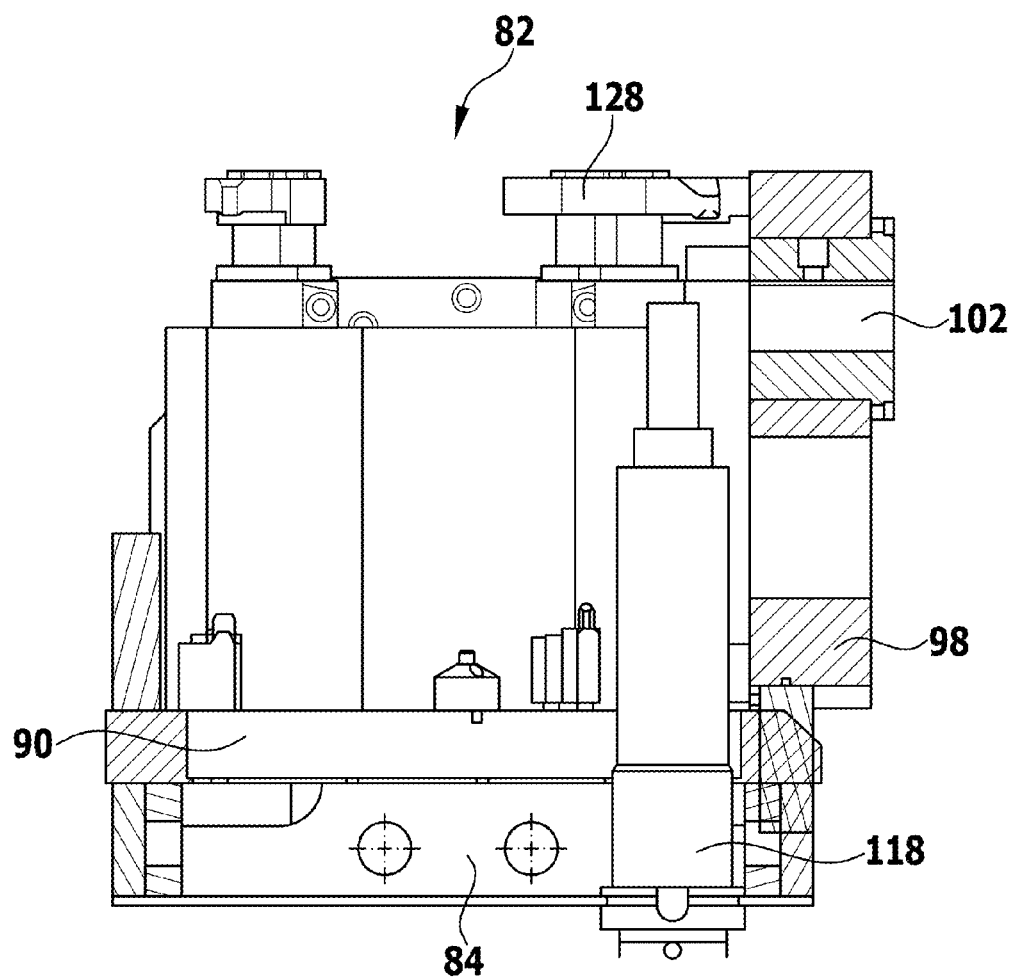
FIG. 8 is a sectional view taken along line 8-8 in accordance with FIG. 7.
Figure 9:
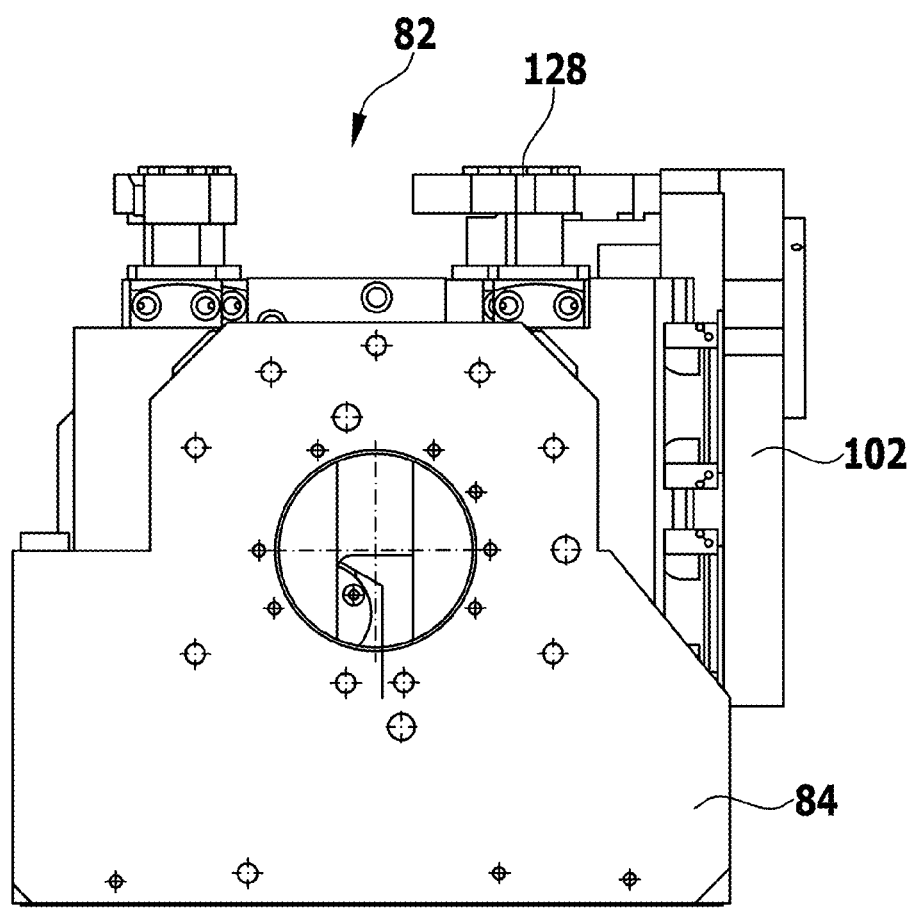
FIG. 9 is a side view of the workpiece clamping apparatus in accordance with FIG. 6, seen in the direction G.
Figure 10:
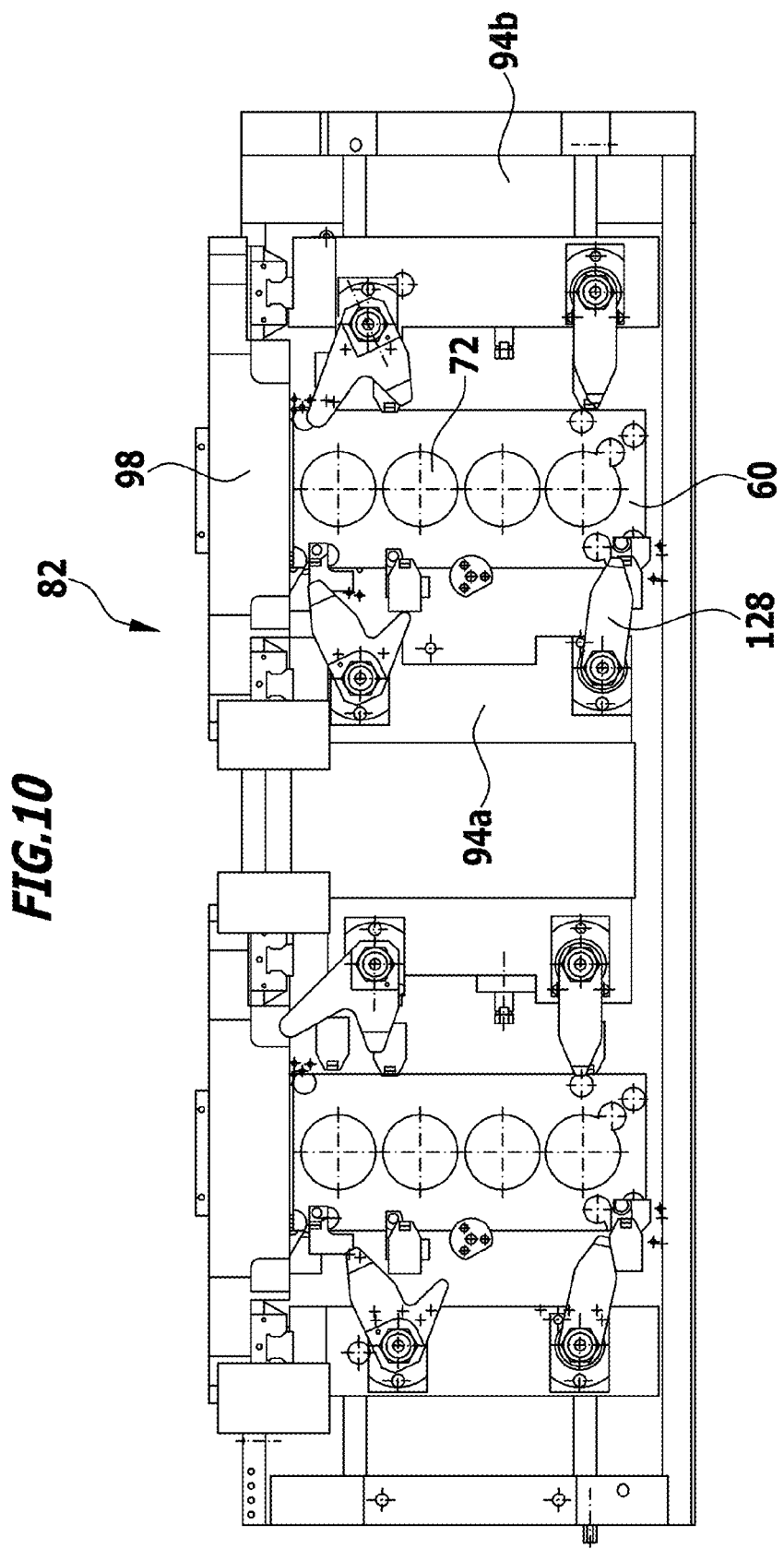
FIG. 10 is a top view of the workpiece clamping apparatus in accordance with FIG. 6.
Figure 11:
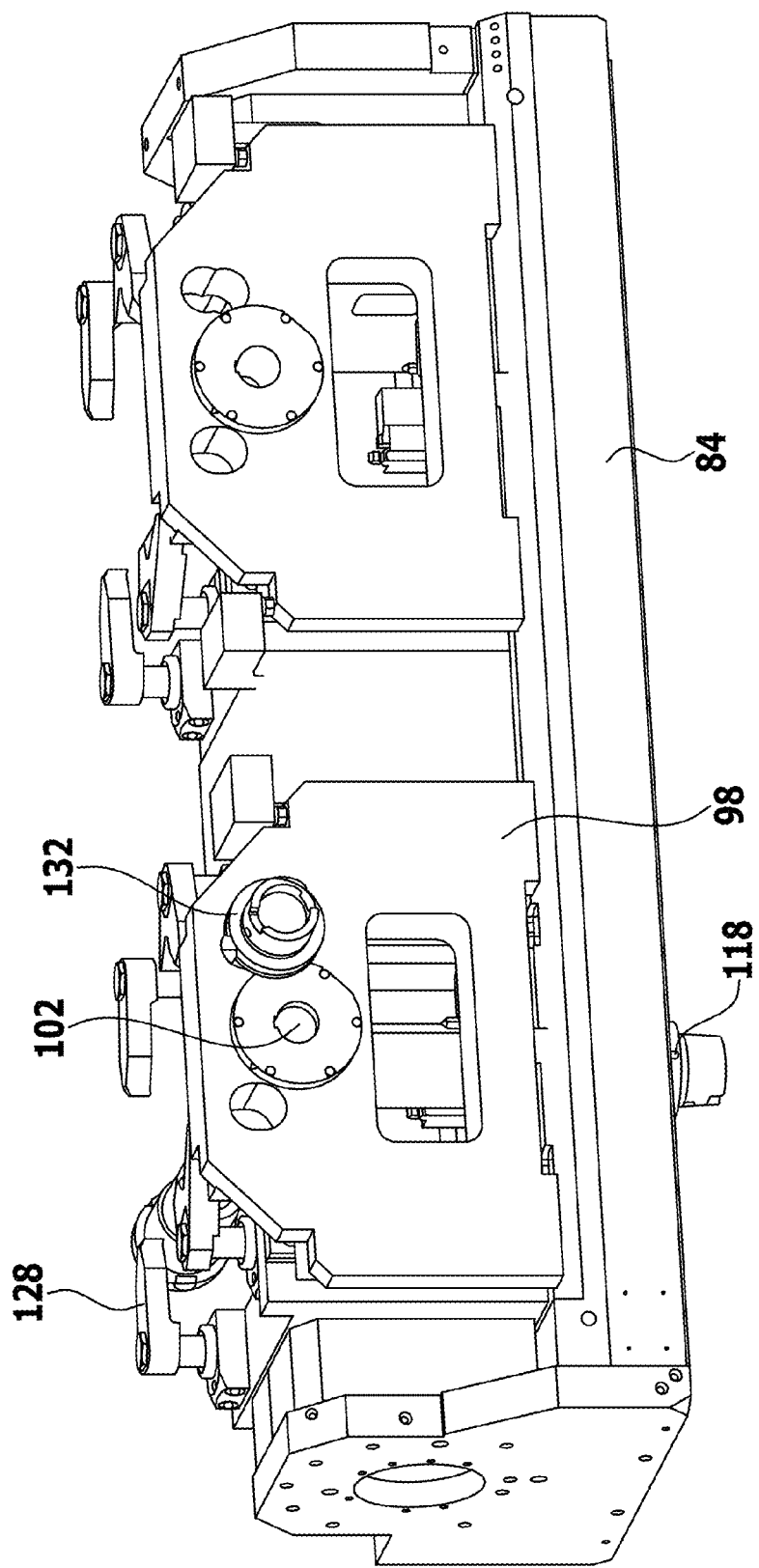
FIG. 11 is a further perspective view of the workpiece clamping apparatus in accordance with FIG. 6.
Figure 12:
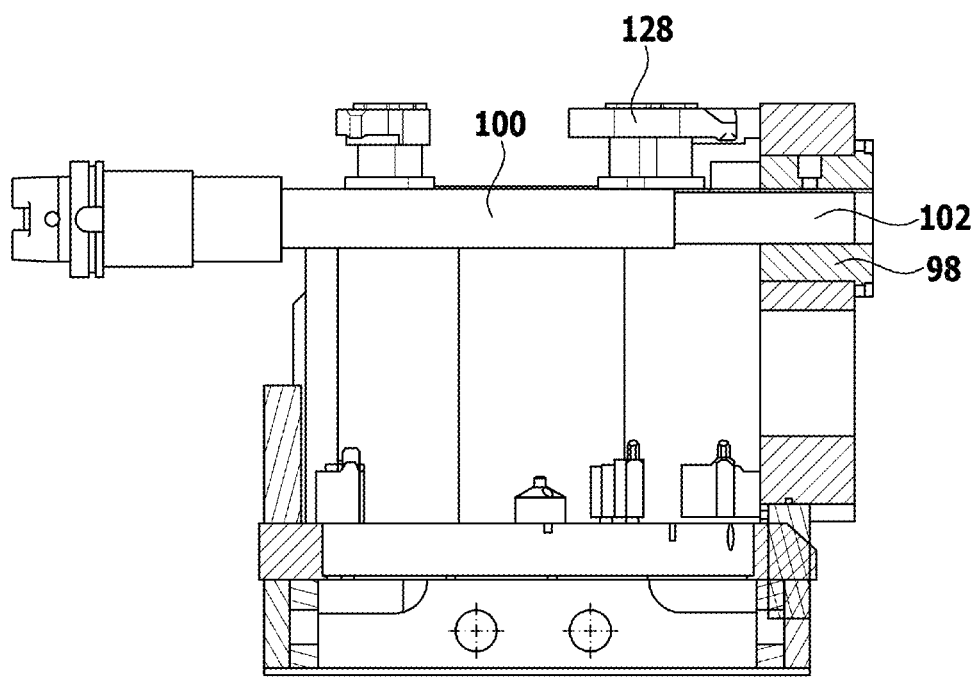

In an exemplary embodiment in which the machine tool 10 is a double-spindle machine having a first tool spindle 18a and a second tool spindle 18b, two engine blocks 60 are worked preferably at the same time or in quick succession and accordingly two engine blocks 60 are then positioned on the workpiece carrier 32 (cf. FIGS. 4 and 5). In principle, there may be provided two separate workpiece clamping apparatuses or, for example and as will be explained in greater detail below, there may be provided a single workpiece clamping apparatus comprising two receiving places, each for receiving a respective first and second engine block.

It is further possible for the corresponding workpiece clamping apparatus (or the corresponding workpiece clamping apparatuses) to be fixedly arranged on the workpiece carrier 32. Loading the machine tool 10 with workpieces 60 is then realized as loading the corresponding workpiece clamping apparatus, or workpiece clamping apparatuses, on the workpiece carrier 32. The unloading is performed accordingly.

In an alternative embodiment, the workpiece clamping apparatus(es) is (are) capable of being releasably fixed at the workpiece carrier 32. Loading and unloading a workpiece clamping apparatus can then be realized outside the machine tool 10. A loaded workpiece clamping apparatus is fixed to the workpiece carrier 32. The machine tool 10 is then, in a sense, loaded with a workpiece clamping apparatus. For unloading, the workpiece clamping apparatus is released from the workpiece carrier 32 and the workpiece unloading is then realized outside of the machine tool 10.

In an exemplary embodiment, the workpiece carrier 32 comprises a first workpiece slide 74 and a second workpiece slide 74b (FIG. 4). These workpiece slides are each displaceable in particular in the Z-direction relative to the machine frame 14. A connecting device 76 is provided which connects the two workpiece slides 74a and 74b. The one or more workpieces are capable of being fixed at the connecting device 76 (via the workpiece clamping apparatus). The connecting device 76 forms a bridge between the first workpiece slide 74a and the second workpiece slide 74b.

It is possible for the connecting device to comprise a clamping mechanism by way of which a first bridge element 78a which is held at the first workpiece slide 74a and a second bridge element 78b which is held at the second workpiece slide 74b are capable of being clamped together, with this connection being capable of being released. In this connection, reference is made to EP 2 185 314 B1, which is incorporated herein and made a part hereof by reference in its entirety and for all purposes.

When the first bridge element 78a and the second bridge element 78b are connected (clamped) together, then the connecting device 76 as a whole (and thus also workpieces 60 positioned thereon) can be pivoted about for example the A-axis.

There are essentially two different ways of fixing an engine block 60 at the workpiece carrier 32.

In one exemplary embodiment (FIG. 4), an engine block 60 is placed on the workpiece carrier 32 (in the present case on the connecting device 76) with its oil pan side 64 down. In an alternative embodiment (FIG. 5), an engine block 60 as a workpiece is placed on the workpiece carrier 32 (on the connecting device 76) with its cylinder head side 62 down.

If the engine block 60 is positioned with its oil pan side 64 down, then the second working operation 70 (cf. FIG. 4) for making the cylinder bores 72 can take place from a side that is not obstructed by the connecting device 76.

In the case that an engine block 60 is positioned with its cylinder head side 62 down, the second working operation 70 takes place from a side which is, in principle, blocked by the connecting device 76. Therefore, the connecting device 76 has arranged thereon one or more recesses 80 (indicated in FIG. 5) which allow passage of the second tool therethrough in order to perform the second working operation 70 on the engine block 60.

For fixing one or more workpieces (engine blocks 60) at the workpiece carrier 32, a workpiece clamping apparatus is provided, an exemplary embodiment of which is illustrated in FIGS. 6 to 12 and is designated by 82. The workpiece clamping apparatus 82 is configured such that a clamping setup of a workpiece 60 need not be changed if after completion of the first working operation 66 the second working operation 70 is to be carried out or if after completion of the second working operation 70 the first working operation 66 is to be carried out.

The workpiece clamping apparatus 82 comprises a base 84 via which it is fixed or capable of being fixed to the workpiece carrier 32 (to the connecting device 76 in particular). As mentioned earlier, the workpiece clamping apparatus 82 can be arranged on the workpiece carrier 32 in a fixed manner or in a releasable manner.

The workpiece clamping apparatus 82 comprises (at least) one receptacle 86 for a workpiece. In an exemplary embodiment, the workpiece clamping apparatus 82 comprises a plurality of receptacles 88a, 88b for a plurality of workpieces 60. By way of example, the number of receptacles corresponds to the number of tool spindles 18a, 18b on the machine tool 10.

A receptacle comprises a receptacle bottom 90, and a wall 92 projects beyond the receptacle bottom 90. The wall 92 in turn comprises opposite side walls 94a, 94b. Arranged between the side walls 94a, 94b is a wall area 96, likewise projecting beyond the receptacle bottom 90. Said wall area 96 is configured as a counter-bearing 98 for the first tool (indicated in FIG. 6 by the reference numeral 100).

The counter-bearing 98 has an entry recess 102 capable of having the first tool 100 entering thereinto in order to provide a counter-bearing 98 for the first tool 100 when a workpiece is being worked.

Formed by the wall 92 including the side walls 94a, 94b and the counter-bearing 98 is a receiving space 104. Said receiving space 104 has an opening 106. Said opening 106 is oriented at least approximately parallel to the receptacle bottom 90. It has a linear direction/counter-direction 108 associated with it. Said linear direction/counter-direction 108 is oriented transversely and in particular perpendicularly relative to the receptacle bottom 90 or the base 84. A workpiece 60 can be inserted into the receptacle 86 along the linear direction 108 and can then be removed from the receptacle 86 in the corresponding counter-direction.

The receptacle 86 has a first access area 110 associated with it. Via the first access area 110, the first working operation can be performed on the engine block 60. To this end, a free space 112 is formed opposite the counter-bearing 98 through which the first tool 100 can pass and thus also enter the counter-bearing 98 (cf. right side of FIG. 6).

The first access area 110 has a cross-sectional area 114 (cf. FIG. 6) which is oriented transversely and in particular perpendicularly to the opening 106; a normal of the cross-sectional area 114 is transverse to the linear direction/counter-direction 108 and is in particular perpendicular thereto. The cross-sectional area 114 is in particular oriented at least approximately parallel to the counter-bearing 98. The first access area 110 has a first direction 115 associated with it. This lies perpendicular to the cross-sectional area 114 and is a feed direction for the first tool 100 (in particular for entering the bore 68').

The receptacle 86 also has a second access area 116, 116' associated with it. Via the second access area, the second working operation can be performed using a second tool 118 (indicated in FIG. 6). It is in particular possible to work cylinder bores via the second access area 116.

If the workpiece (the engine block 60) is set down with the oil pan side 64 down, then the second access area 116 is the area at the opening 106. A cross-sectional area 120 of the second access area 116 is then transverse and in particular at least approximately perpendicular to the counter-bearing 98. The cross-sectional area 120 is at least approximately parallel to the opening 106. The engine block 60 can be accessed from above in order to enable performing the second working operation using the second tool 118.

If the engine block 60 is positioned cylinder head side 62 down, then the second access area 116' is below the receptacle bottom 90. The latter is provided with one or more recesses 122 through which the second tool 118 can access the workpiece 60.

The second access area 116, 116' has a second direction 119, 119' respectively associated therewith. This lies perpendicular to the cross-sectional area 120.

The workpiece clamping apparatus 82 is configured free of a counter-bearing for the second tool 118; there is no counter-bearing for the second tool 118 to hinder access for working a workpiece or for loading and unloading the workpiece to and from the workpiece clamping apparatus 82.

Arranged at the receptacle 86 are contact elements 124 for the workpiece 60 at which the workpiece 60 is capable of being clamped. A clamping device 126 is provided by way of which the workpiece is capable of being clamped in an axial direction (relative to the direction/counter-direction 108) and is thus capable of being fixed in the receptacle 86.

In an exemplary embodiment, the clamping device 126 comprises pivot elements 128 which are arranged at the side walls 94*a*, 94*b*. The pivot elements 128 are capable of being pivoted in such a way that the opening 106 is cleared and the workpiece 60 is capable of being inserted from above in the direction 108 or removed in the counter-direction. Furthermore, the pivot elements are capable of being pivoted in such a way that they are capable of being brought over the workpiece 60 after the latter has been inserted, in order to provide for axial clamping.

The receptacle 86 including the contact elements 124 is in particular configured such that a form-locking positioning of the workpiece 60 in the receptacle 86 is possible in a direction transverse to the axial direction.

In particular, provision may be made for the counter-bearing 98 to have one or more recesses 130 arranged therein through which fixing elements 132 are capable of entering corresponding fixing recesses of the workpiece 60 in order to provide for additional fixing or clamping.

In an exemplary embodiment, the workpiece clamping apparatus 82 comprises a height adjustment device 134 (cf. FIG. 7) in associated relation with the corresponding receptacle 86. The height adjustment device allows a height position of the counter-bearing 98 to be adjusted relative to the receptacle bottom 90 in a direction/counter-direction 136. This makes it possible to individually adapt to workpieces 60 at the receptacle 86.

In particular, the direction/counter-direction 136 is parallel to the linear direction/counter-direction 108.

If a plurality of receptacles 86 are provided, then the other receptacles have in principle identical configuration to that described above.

The working procedure is as follows.

One or more workpieces are inserted into the workpiece clamping apparatus 82. Insertion is from above in the direction 108. The workpiece(s) is (are) clamped by the few clamping devices 126.

The workpiece carrier 32, which has the workpiece clamping apparatus 82 fixed thereto, is oriented with respect to the one or more tool spindles 18*a*, 18*b*. If the first working operation 66 is performed, then the first tool 100 is passed through the first access area 110 and through the bore 68', where the crankshaft bearing bore 68 is to be produced, and thereby into the entry recess 102 of the counter-bearing 98. The first tool 100 comprises a pull rod or pull/push rod which acts upon one or more pushers. In working a workpiece, these pushers, which are provided with or act upon a cutting edge, are advanced towards the workpiece in a direction transverse to a rotational direction of said cutting edges.

With regard to a tool comprising a pull/push rod, confer for example DE 10 2010 039 096 A1 or US 2013/0147130, which are incorporated herein and made a part hereof by reference in their entirety and for all purposes.

When the first working operation has been completed, the cutting edges (pushers) are retracted so that the first tool 100 is capable of being withdrawn from the workpiece.

Figure 13:
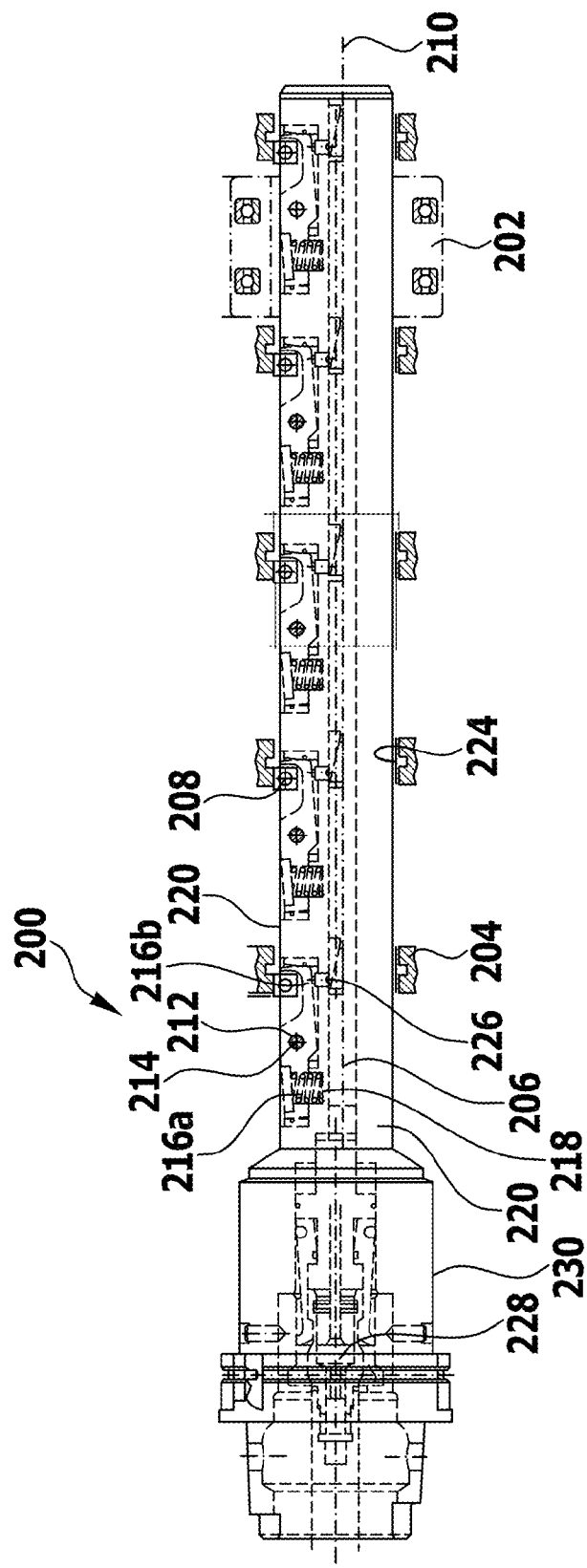
FIG. 13 is an exemplary embodiment of a tool having movable cutting edges, showing the tool as positioned on a workpiece.
Figure 14:
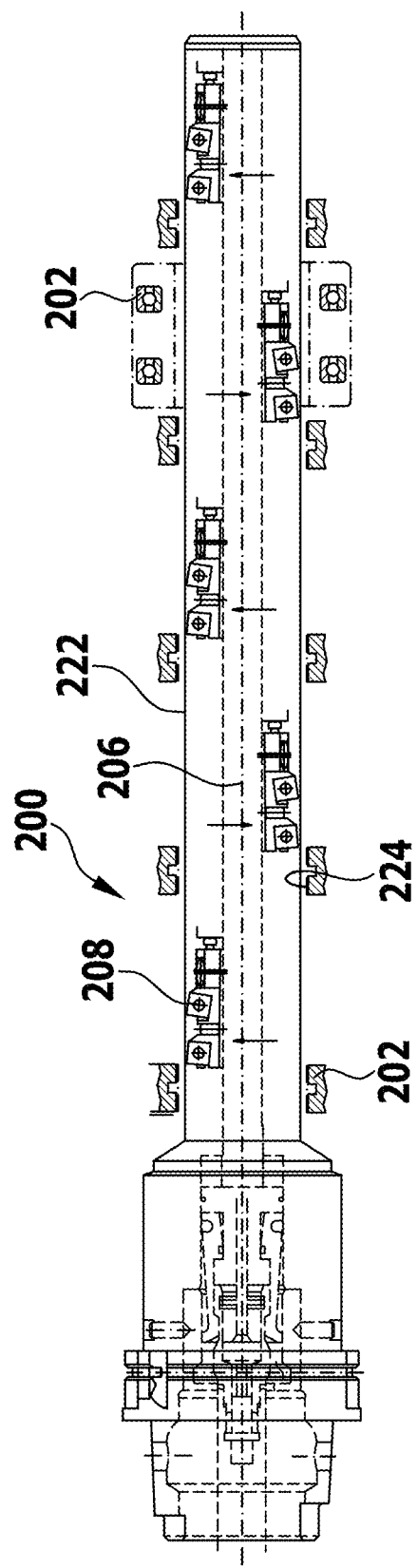
FIGS. 14(a), (b), (c) show the sequence of positioning the tool in accordance with FIG. 13 on a workpiece.
Figure 14:
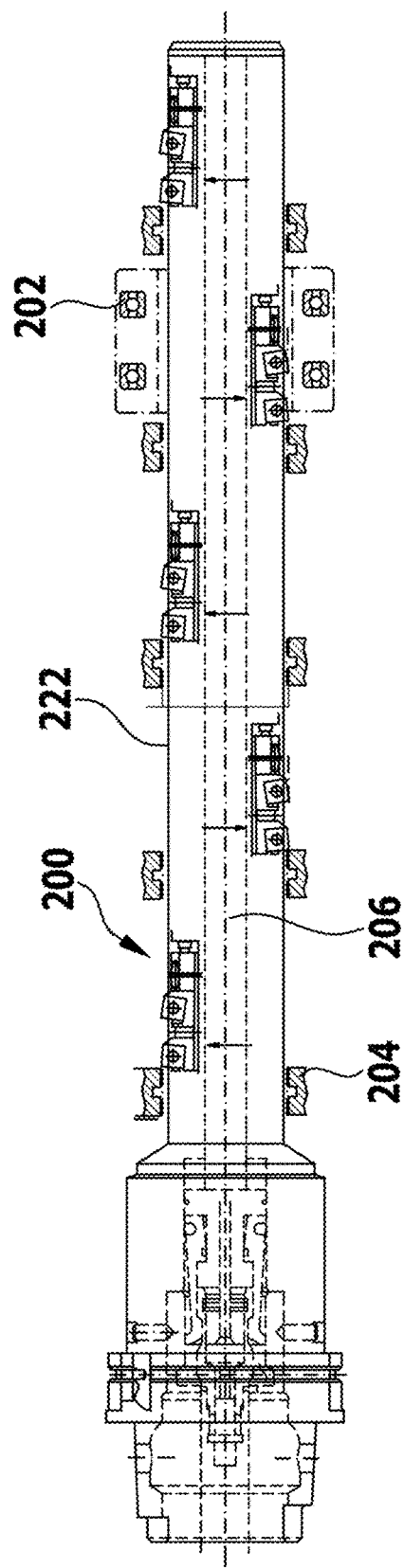
Figure 14:
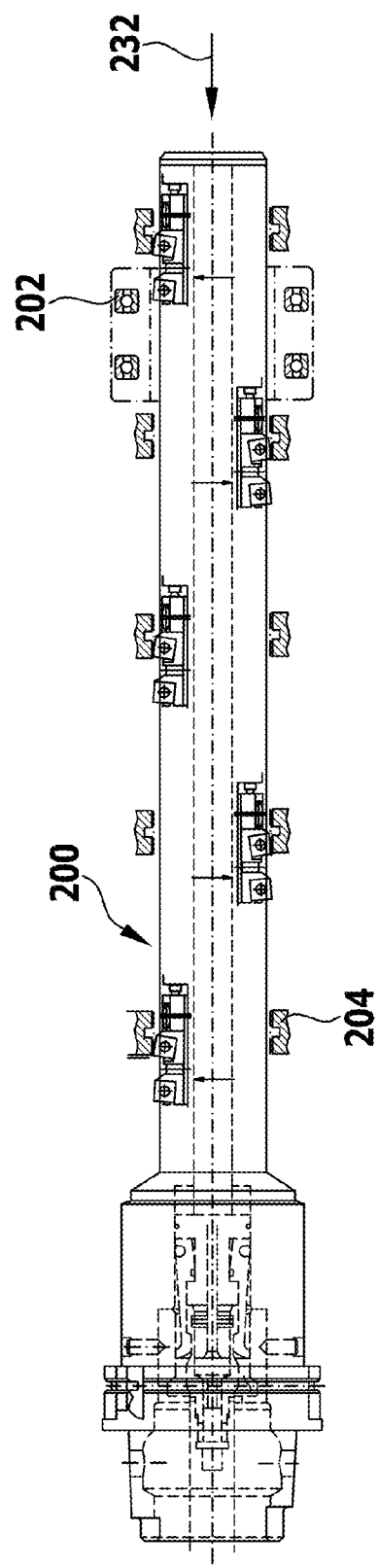

In an exemplary embodiment of a tool for a tool spindle 18*a*, 18*b* which is shown in FIGS. 13, 14(*a*), (*b*) and (*c*) and indicated therein by 200, a counter-bearing 202 is provided. In the exemplary embodiment illustrated, said counter-bearing 202 is arranged inside a workpiece 204 (only partially indicated in FIGS. 13 and 14).

The tool 200 is located on a tool spindle. It comprises a displaceable rod 206. Coupled to this displaceable rod 206 are cutting edges 208. In an exemplary embodiment, a plurality of cutting edges 208 are provided in spaced-apart relation in the longitudinal direction 210 of the tool.

A cutting edge 208 (at least one cutting edge 208) is arranged on a pivot element 212. The pivot element 212 is pivotally mounted to the tool 200. A pivot axis 214 is oriented transversely and in particular perpendicularly with respect to the longitudinal direction 210. The pivot element 212 comprises a first area 216*a* and a second area 216*b*. The pivot axis 214 is between the first area 216*a* and the second area 216*b*.

The first area 216*a* is supported on a holding element 220 of the tool 200 via a spring 218. The holding element 220 also provides guidance to the rod 206 for linear displacement therein. The (at least one) cutting edge 208 is located in the second area 216*b*.

The spring 218 is configured such that when no force loading is applied to the second area 216*b*, the spring 218 positions the pivot element 212 in such a way that the cutting edge 208 is set back in relation to an outer surface 222 of the tool 200 or is at most flush therewith. When in this position, the cutting edge 208 does not project beyond the outer surface 222, and the holding element 220 can be entered into a recess 224 of the workpiece 204.

Positioned on the rod 206 and in associated relation with the respective pivot element 212 is an actuating element 226. The actuating element 226 is displaceable along with the rod 206. When appropriately positioned, the actuating element can act upon the second area 216*b* and pivot the pivot element 212 upwardly in opposition to the force 218 so that the cutting edge 208 projects beyond the outer surface 222 (cf. FIG. 13). This corresponding position is then maintained by the position of the rod 206.

By displacing the rod 206 in such a manner that the actuating element 226 ceases to act upon the pivot element 212, the pivot element 212 is caused to pivot downwardly so that the cutting edge 208 no longer projects beyond the outer surface 222.

By positioning the rod 206, an adjustment can thus be made as to whether or not the cutting edges 208 on the holding element 220 project beyond the outer surface 222.

For moving and positioning the rod 206, the tool 200 has a drive 228, such as an electric motor, which is arranged in a housing 230. The housing 230 in turn has the holding element 220 located thereon.

Shown in FIG. 14(*a*) is a position of the rod 206 in which the cutting edges 208 do not project beyond the outer surface 222. The holding element 220 including the cutting edges 208 located thereon can thereby be entered into the recess 224 and also passed through the counter-bearing 202.

After this process has been completed, the cutting edges 208 are caused to extend and in particular to pivot outwardly beyond the outer surface 222 by a corresponding linear displacement of the rod 206. The cutting edges 208 are thereby placed in an operative position and a workpiece working operation can be effected by rotating the holding element 220.

Indicated in FIG. 14(*c*) is a part of a working operation in which the holding element 220 including the cutting edges 208 is displaced in a direction 232, wherein a boring operation is being performed.

The tool 200 has an advancement capability of the cutting edges 208. The cutting edges 208 are retracted (moved inwardly) when the tool 200 is fed into the recess 224 (bore) of the workpiece 204. For reverse working, when the tool 200 is linearly displaced as a whole in the direction 232, the cutting edges 208 are extended (moved outwardly). The need for lifting or displacing the workpiece 204 is thereby eliminated.

In a further exemplary embodiment of a tool 234 (FIGS. 15 and 16), a counter-bearing 236 is arranged outside of a workpiece 238 that is to be worked.

A holding element 240 of the tool 234 which holds cutting edges 242 has an end 244 located outside of the workpiece 238; for a working operation, the holding element 240 is passed completely through a corresponding recess of the workpiece 238 and projects beyond the workpiece 238 in the area of the end 244.

Figure 15:
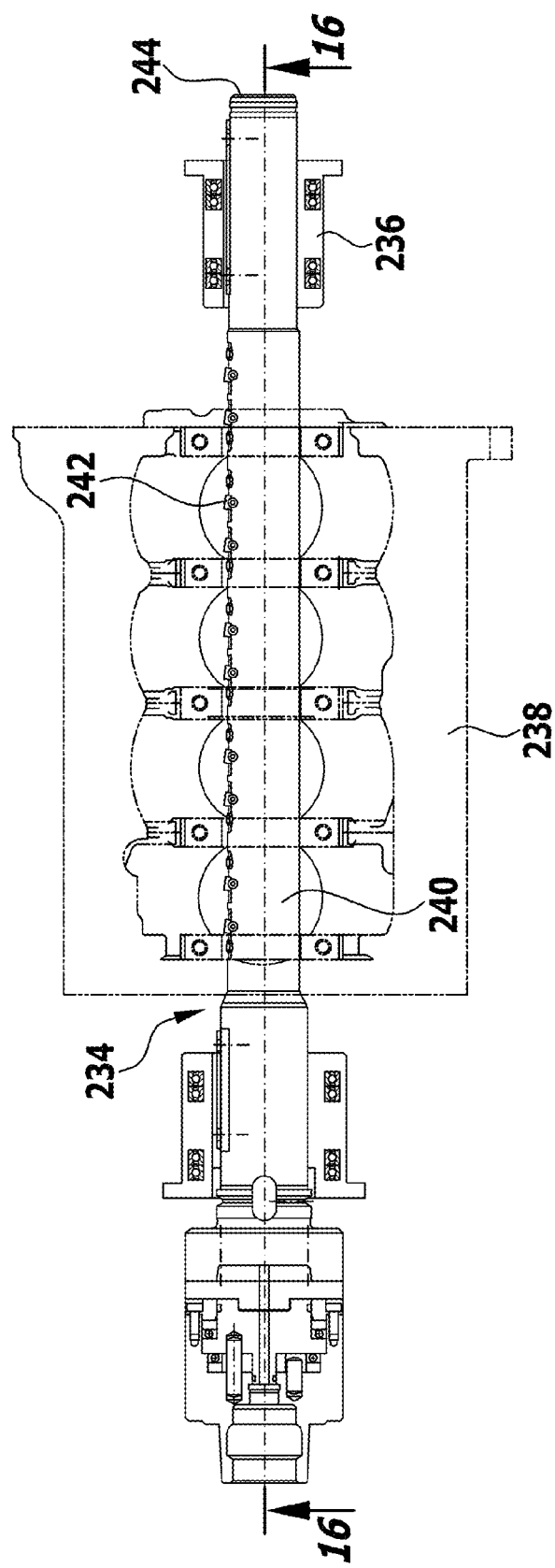
FIG. 15 is a further exemplary embodiment of a tool, showing the tool as positioned on a workpiece.
Figure 16:
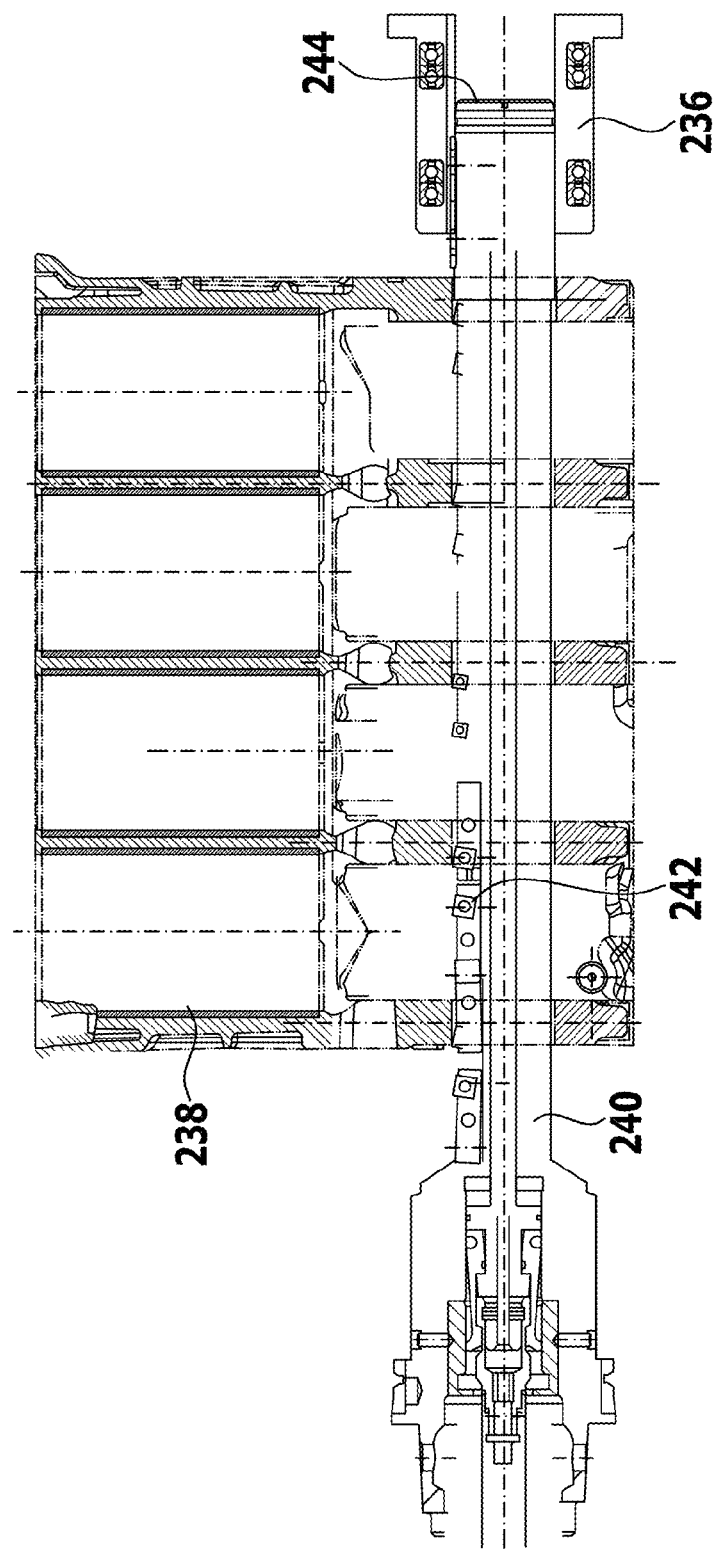
FIG. 16 is a sectional view along line 16-16 in accordance with FIG. 15, showing the tool in a different position.

The tool 234 in turn comprises a displaceable rod for actuating or positioning the cutting edges 242. Said rod is positioned such that for the entry of the holding element 240 into the bore of the workpiece 238, the cutting edges 242 are in their retracted positions. They are then extended for working the workpiece (cf. FIGS. 15 and 16). FIG. 15 shows an initial operation of working the workpiece. The direction of travel of the tool 234 is then reversed for performing a boring operation on the workpiece.

Use of the tool 200 or 234 advantageously allows a crankshaft bore to be worked.

Thereafter, the workpiece clamping apparatus 82 is pivoted without changing the clamping setup of the workpiece with respect to the workpiece clamping apparatus 82 and thus with respect to the workpiece carrier 32. By way of example, such pivotal action is realized about the A-axis via the workpiece carrier 82. The pivoting is realized such that the workpiece 60 is (via the workpiece clamping apparatus 82) positioned relative to the second tool 118 (cf. FIG. 8, for example). Meanwhile, in particular, the second tool 118 has been substituted for the first tool 100 on the corresponding tool spindle. The workpiece clamping apparatus 82 is positioned such that the second working operation 70 is capable of being performed on the workpiece 60 via the second access area 116 or 116'.

Thereafter, the corresponding work of the second working operations 70 is performed, in which cylinder bores 72 in particular are worked.

It is in principle also possible for the second working operation 70 to be performed first, followed by pivoting the workpiece clamping apparatus 82 in such a way that upon completion of the second working operation 70, the first working operation 66 is performed.

The workpiece clamping apparatus 82 is configured free of a counter-bearing with respect to the second tool 118; i.e., there is no counter-bearing provided for the second tool.

This makes it possible for the first working operation 66 and the second working operation 70 to be performed on the workpiece 60 without changing the workpiece's clamping setup at the workpiece clamping apparatus 82. Access to the workpiece is not hindered by any counter-bearing for the second tool 118. Furthermore, the load and unload operations of a workpiece at the workpiece clamping apparatus 82 are likewise not hindered by a counter-bearing for the second tool 118.

This results in a time-efficient working because the clamping setup need not be changed. Furthermore, the second tool 118 need not be driven into a counter-bearing; the result here is a minimization of time. Furthermore, a workpiece can be easily loaded and unloaded to and from the workpiece clamping apparatus 82 and the result here, too, is a time-efficient working.

LIST OF REFERENCE CHARACTERS 10 machining center
12 machine bed
14 machine frame
16 tool carrier device
18a first tool spindle
18b second tool spindle
20a rotational axis
20b rotational axis
22 slide
24 slide guide
26 drive device
28 slide
30 slide guide
32 workpiece carrier
34 storage device
36 tool
38 workspace
40 tool changing device
41 control device
42 control cabinet
44 front side
46 rear side
48 additional device
50 cleaning device
56 tool
60 engine block
62 cylinder head side
64 oil pan side
66 first working operation
68 crankshaft bearing bore
68' bore
70 second working operation
72 cylinder bore
74a first workpiece slide
74b second workpiece slide
76 connecting device
78a first bridge element
78b second bridge element
80 recess
82 workpiece clamping apparatus
84 base
86 receptacle
88a receptacle
88b receptacle
90 receptacle bottom
92 wall
94a side wall
94b side wall
96 wall area
98 counter-bearing
100 first tool
102 entry recess
104 receiving space
106 opening
108 linear direction
110 first access area
112 free space
114 cross-sectional area
115 first direction
116 second access area 116' second access area
118 second tool
119 second direction
119' second direction
120 cross-sectional area
122 recess
124 contact element
126 clamping device
128 pivot element
130 recess
132 fixing element
134 height adjustment device
136 direction/counter-direction
200 tool
202 counter-bearing
204 workpiece
206 rod
208 cutting edge
210 longitudinal direction
212 pivot element
214 pivot axis
216a first area
216b second area
218 spring
220 holding element
222 outer surface
224 recess
226 actuating element
228 drive
230 housing
232 direction
234 tool
236 counter-bearing
238 workpiece
240 holding element
242 cutting edge
244 end

The invention claimed is:

1. A method for working a workpiece on a machine tool, comprising:
providing a machine tool comprising a tool spindle and a workpiece clamping apparatus;
wherein the tool spindle and the workpiece clamping apparatus are displaceable relative to each other in at least three linearly independent directions;
wherein the workpiece clamping apparatus comprises a receptacle for the workpiece;
fixing the workpiece in the workpiece clamping apparatus; and
inserting a first tool in the tool spindle and performing a first working operation using the first tool;
wherein the first tool is positioned on a counter-bearing of the workpiece clamping apparatus;
performing a tool change by removing the first tool from the tool spindle and inserting a second tool in the tool spindle; and
performing a second working operation on the workpiece separated in time from the first working operation and using the second tool;
wherein the second tool is positioned relative to the workpiece clamping apparatus in a manner free of a counter-bearing;
wherein the workpiece is an engine block comprising a crankshaft bearing bore and exactly one row of cylinder bores;
wherein the workpiece is fixed with a cylinder head side down in the workpiece clamping apparatus;
wherein the workpiece is clamped by a clamping device at an oil pan side opposite to the cylinder head side and is fixed in the receptacle;
wherein the receptacle comprises opposite side walls and a wall area there between and said wall area is configured as the counter-bearing;
wherein the first working operation is the crankshaft bearing bore working operation on the crankshaft bearing bore and the second working operation is a cylinder bore working operation on the cylinder bores;
performing at least one of (i) pivoting the workpiece clamping apparatus as a whole about an axis running transversely to the crankshaft bearing bore after completion of the first working operation in order to position the workpiece relative to the second tool for the second working operation and (ii) pivoting the workpiece clamping apparatus as a whole about an axis running transversely to the crankshaft bearing bore after completion of the second working operation in order to position the workpiece relative to the first tool for the first working operation;
wherein the workpiece is located in the same clamping setup for the first working operation and for the second working operation;
wherein a receptacle bottom is provided with at least one through-recess for the second tool, wherein the second tool passes through the at least one through-recess in order to perform the second working operation.

2. The method in accordance with claim 1, wherein the workpiece is inserted into the receptacle of the workpiece clamping apparatus in a linear direction and is removed therefrom in a counter-direction.

3. The method in accordance with claim 1, wherein the first tool comprises at least one tool element advanceable towards the workpiece, wherein the at least one tool element is in a retracted position when the first tool enters a recess of the workpiece and is then extended for working the workpiece.

4. The method in accordance with claim 1, wherein the workpiece clamping apparatus comprises a height adjustment device, wherein a height position of the counter-bearing is adjusted relative to the receptacle bottom.

5. The method in accordance with claim 1, wherein the clamping device comprises pivot elements, which are arranged at the side walls, and the pivot elements are pivoted in order to clamp the workpiece.

6. A method for working a workpiece on a machine tool, comprising:
providing a machine tool comprising a tool spindle and a workpiece clamping apparatus;
wherein the tool spindle and the workpiece clamping apparatus are displaceable relative to each other in at least three linearly independent directions;
fixing the workpiece in the workpiece clamping apparatus; and
inserting a first tool in the tool spindle and performing a first working operation using the first tool;
wherein the first tool is positioned on a counter-bearing of the workpiece clamping apparatus;
performing a tool change by removing the first tool from the tool spindle and inserting a second tool in the tool spindle; and
performing a second working operation on the workpiece separated in time from the first working operation and using the second tool;

wherein the second tool is positioned relative to the workpiece clamping apparatus in a manner free of a counter-bearing;

wherein the workpiece is an engine block comprising a crankshaft bearing bore and exactly one row of cylinder bores;

wherein the first working operation is the crankshaft bearing bore working operation on the crankshaft bearing bore and the second working operation is a cylinder bore working operation on the cylinder bores;

performing at least one of (i) pivoting the workpiece clamping apparatus as a whole about an axis running transversely to the crankshaft bearing bore after completion of the first working operation in order to position the workpiece relative to the second tool for the second working operation and (ii) pivoting the workpiece clamping apparatus as a whole about an axis running transversely to the crankshaft bearing bore after completion of the second working operation in order to position the workpiece relative to the first tool for the first working operation;

wherein the workpiece is located in the same clamping setup for the first working operation and for the second working operation.

* * * * *